United States Patent [19]

Donaldson et al.

[11] Patent Number: 4,837,736

[45] Date of Patent: Jun. 6, 1989

[54] BACKPLANE BUS WITH DEFAULT CONTROL

[75] Inventors: Darrel D. Donaldson, Lancaster; Richard B. Gillett, Jr., Westford, both of Mass.

[73] Assignee: Digital Equipment Corporation, Maynard, Mass.

[21] Appl. No.: 44,953

[22] Filed: May 1, 1987

[51] Int. Cl.[4] ............................................ G06F 13/00
[52] U.S. Cl. ................................. 364/900; 364/935; 364/935.2; 364/935.4
[58] Field of Search ... 364/200 MS File, 900 MS File; 307/473

[56] References Cited

U.S. PATENT DOCUMENTS

| | | |
|---|---|---|
| 3,585,399 | 6/1971 | Andrews, Jr. . |
| 4,024,501 | 5/1977 | Herring et al. . |
| 4,141,068 | 2/1979 | Mager et al. ........................ 364/200 |
| 4,149,241 | 4/1979 | Patterson . |
| 4,347,446 | 8/1982 | Price . |
| 4,414,480 | 11/1983 | Zasio . |
| 4,467,436 | 8/1984 | Chance et al. . |
| 4,486,753 | 12/1984 | Saeki et al. . |
| 4,531,068 | 7/1985 | Kraft et al. . |
| 4,550,400 | 10/1985 | Henderson, Jr. et al. . |
| 4,550,402 | 10/1985 | Gable et al. . |
| 4,567,575 | 1/1986 | Morihisa et al. . |
| 4,598,216 | 7/1986 | Lauffer et al. . |
| 4,677,566 | 6/1987 | Whittaker et al. . |
| 4,691,296 | 9/1987 | Struger . |

OTHER PUBLICATIONS

David B. Gustavson, Computer Buses-A Tutorial, 1984, p. 9.
VME Bus Specification Manual, Mostek Corp., Motorola Inc., Signetics/Philips, 1981, pp. 3-1, 3-2, 3-8.
Microprocessors and Microsystems, vol. 10, No. 2, Mar. 1986, Butterworth & Co. (Publishers) Ltd., (London, GB), R. Wilson: "The Physics of Driving Backplane Buses", pp. 61–64.
GB, A, 2175168 (SGS Microelettronica) Nov. 19, 1986.
IBM Technical Disclosure Bulletin, vol. 25, No. 8, Jan. 1983, (New York, US), A Jordan, Jr.: "Bus-Protecting Driver with Error Detection", pp. 4100–4102.
Motorola Technical Developments, vol. 5, No. 8, Oct. 1985, Motorola, Inc. (Schaumburg, Illinois, US), M. Bluhm: "A High Speed Output Buffer", pp. 54–55.
Personal Computer XT and Portable Personal Computer Technical Reference, 4th ed., Boca Raton, Florida, IBM, 1984, pp. (1-1) to (3-10), QA76,8.12594 T4.
John E. Uffenbeck, "Electrical Characteristics of a Bus", In: Microcomputers and Microprocessors: the 8080, 8085, and Z-80 Programing, Interfacing and Troubleshooting (New Jersey, Englewood Cliffs, 1985), pp. 142-160.

*Primary Examiner*—Gareth D. Shaw
*Assistant Examiner*—Michael A. Jaffe
*Attorney, Agent, or Firm*—Finnegan, Henderson, Farabow, Garrett, & Dunner

[57] ABSTRACT

A system for communicating between a plurality of nodes in a computer, each node including logic circuitry or transmitting and receiving data at first and second logic levels. The system includes an arbiter coupled to the nodes for detecting a lack of request activity from the nodes. A default generator is connected to the arbiter and responds to a lack of request activity and the absence of a multi-cycle data transfer being performed on the bus and causes the bus to be driven to one of the first and second logic levels.

7 Claims, 6 Drawing Sheets

BACKPLANE BUS WITH DEFAULT CONTROL

CROSS REFERENCE TO RELATED APPLICATION

Applicants hereby specifically incorporated by reference herein the content of U.S. patent application Ser. No. 044,470 entitled Apparatus and Method for Determining Access to a Bus by Darrel D. Donaldson and Richard B. Gillett, Jr., filed on the same date as the present application.

BACKGROUND OF THE INVENTION

The present invention relates to data processing systems and, in particular, to a system bus for use in such systems which utilize CMOS circuitry. The present invention concerns a control for such a bus whereby inactivity on the bus is sensed and the bus is subsequently driven to a defined logic level.

In computer systems and other data processing systems, a bus is commonly employed to interconnect the various elements of the systems. For example, a central processing unit is typically connected to elements such as memory devices, input/output devices, etc. via a bus capable of carrying the signals associated with the operation of each element. These signals include, for example, data signals, clock signals and other control signals. The bus must be capable of carrying such signals to all of the elements coupled to it so that the desired operation can be carried out by the computer system.

Because the bus is utilized in virtually every operation performed by the computer system, it is a key element whose characteristics have a major impact on overall performance of the system. For example, the speed of an operation is limited to a degree by the bus since many of the signals within the computer must be transmitted via the bus to the appropriate element; thus, the speed at which the bus is capable of responding to and carrying data is a critical consideration.

One attempt to achieve higher speed on a bus involves the use of a circuit to restore the bus to a known level, such as one of the logical levels of the bus. However, restoring the bus to one of the logic levels tends to increase the speed of switching in only one direction, i.e., either the rising or falling edge.

Furthermore, the reason for restoring the bus to one of the logic levels is to prevent the bus from assuming a level intermediate to a high and low level during periods of inactivity on the bus. In conventional systems, such an intermediate level needs to be avoided since it causes input receivers to be biased as linear amplifiers instead of as digital logic gates. When operating as linear amplifiers the input receivers dissipate excessive power which might result in permanent damage to the bus receiver circuits.

In order to increase the speed of the rising and falling edges and avoid this excess power, a central resource can be used to detect periods of inactivity on the bus and then, during such periods, force the bus to one of the logical levels thus eliminating the intermediate bias level on the input receivers connected to the bus. The operation of forcing the bus to one of the logical levels during periods of inactivity is referred to as "defaulting" the bus. On a bus where there is no single resource with enough information to determine when the bus should be defaulted, this simple approach cannot be used.

SUMMARY OF THE INVENTION

It is therefore an object of the present invention to ensure reliable operation of a computer system bus by driving the bus to a defined DOD logic level whenever the bus is otherwise not being used by the computer system.

Another object of the invention is to provide such a bus which allows direct use with electronic circuits utilizing CMOS (Complementary Metal Oxide Semiconductor) technology without need for interfacing through non-CMOS devices.

Additional objects and advantages of the invention will be set forth in part in the description which follows and, in part, will be obvious from the description or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the system of this invention for transmitting and receiving data between a plurality of nodes containing logic circuit means for selectively transmitting the data at first and second logic levels, comprises: a bus coupled to the nodes for carrying the data between the nodes; means for biasing the bus to place the bus at a voltage level intermediate the first and second logic levels if none of said nodes is transmitting data on the bus; arbiter means coupled to the nodes for detecting a lack of request activity from the logic circuit means coupled to the bus and activating a conditional default line whenever data are not present on the bus, and an extend bus cycle line coupled to the nodes for notifying the nodes that a multi-cycle transfer is being performed by one of the nodes; default generator means within at least one of the nodes coupled to the extend bus cycle line and designed to be connected to the conditional default line from the arbiter means, for activating a default bus signal during cycles when there is no activity on the bus as determined by the conditional default line being activated and the extend bus cycle line being deactivated in a previous cycle; and means, within each node containing the default generator means and responsive to the default bus signal, for driving the bus to one of said first and second logic levels, instead of allowing the bus to assume the intermediate voltage level means, upon detection by the default generator means of the lack of activity.

The accompanying drawings, which are incorporated in and constitute part of this specification, illustrate one embodiment of the invention and, together with the description, serve to explain the principles of the invention.

DETAILED DESCRIPTION OF THE PREFERRED EMBODIMENT

Figure 1:
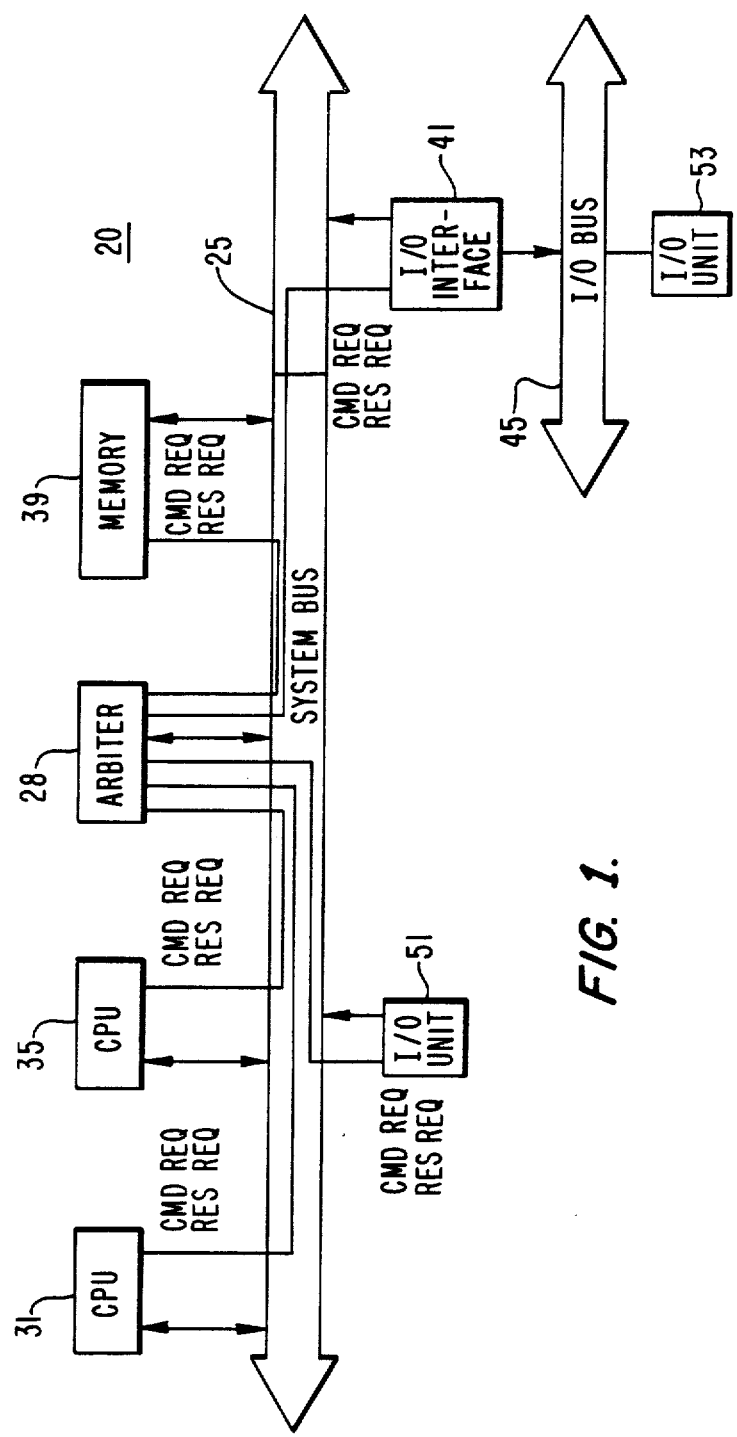
FIG. 1 is a block diagram of a data processing system including a system bus and embodying the present invention.

Reference will now be made in detail to the presently preferred embodiment of the invention, an example of which is illustrated in the accompanying drawings. Throughout the drawings, like reference characters are used to indicated like elements.

The following discussion is divided into two parts: Section A, which provides an overview of the entire data processing system; and Section B, which provides details regarding the invention specific to the instant appended claims.

A. System Overview

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/O unit 51. I/O unit 53, is coupled to system bus 25 by way of I/O bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which lines are asserted). The arbiter then responds to one of the asserted request lines to grant the corresponding node access to bus 25 according to a priority algorithm In the preferred embodiment, arbiter 28 maintains two independent, circular queues one for the commander requests and one for the responder requests. Preferably, the responder requests have a higher priority than the commander requests and are handled before the commander requests.

The commander request lines and responder request lines are considered to be arbitration signals. As illustrated in FIG. 1, arbitration signals also include point-to-point conditional grant signals from central arbiter 28 to each node, system bus extend signals to implement multi-bus cycle transfers, and system bus suppression signals to control the initiation of new bus transaction, when, for example, a node like a memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or law DC voltages, reset signals used during initialization, node failure signals, default signals used during idle bus cycles, and error default signals. The console/front panel signals include signals to transmit and receive serial data to a system console, bolt signals to control the behavior of a boot processor during power-up, signals to enable modification of the erasable PROM of processors on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
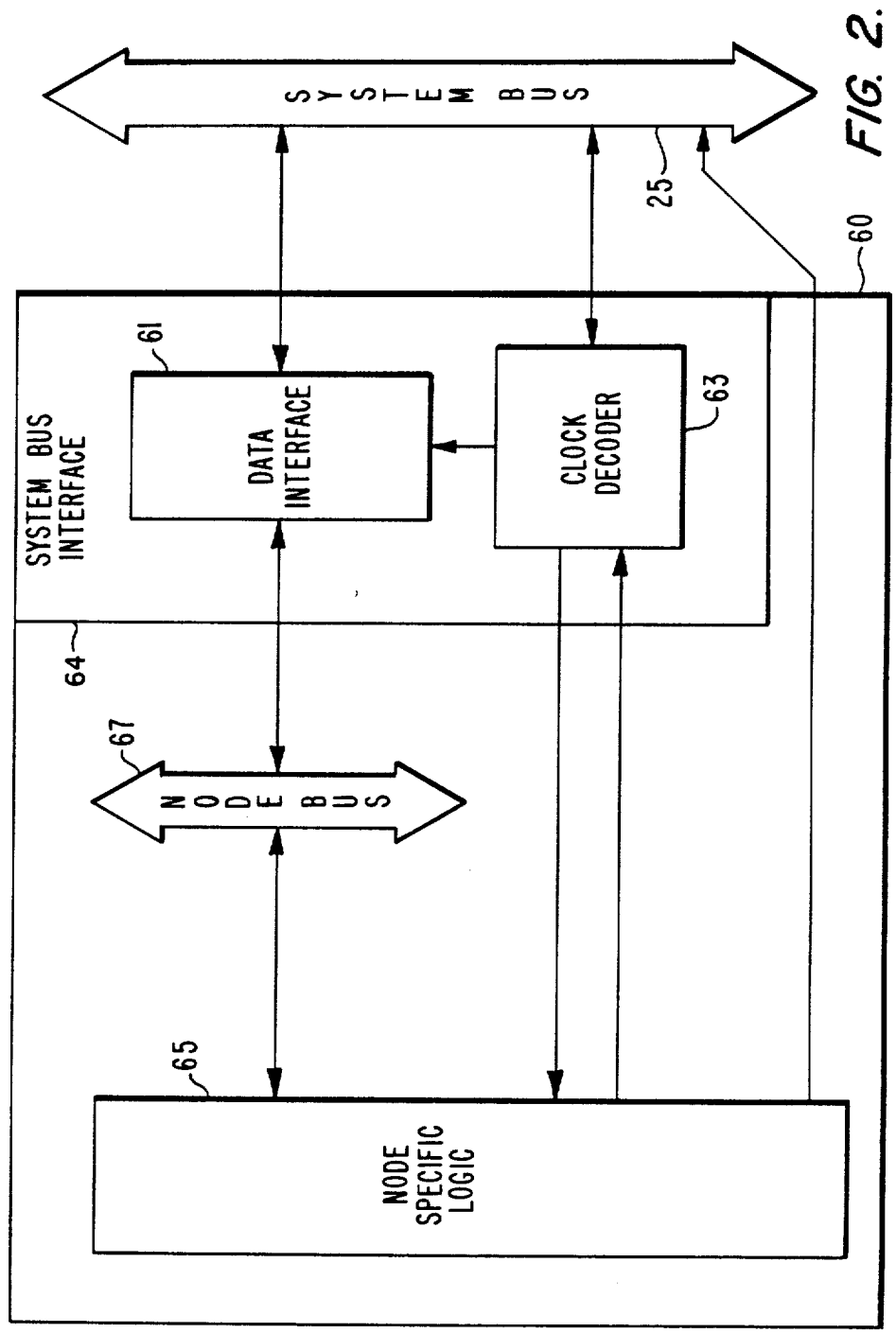
FIG. 2 is a block diagram of a node coupled to a backplane system bus in the data processing system of FIG. 1.

FIG. 2 shows an example of a node 60 connected to system bus 25 Node 60 could be a processor, a memory, an I/O unit or an I/O interface as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 61, and node bus 67 are standard elements for nodes connected to system bus 25. The node specific logic 65 preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 provides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 use the centrally generated clock signals, node 60 will operate synchronously with system bus 25.

Figure 3:
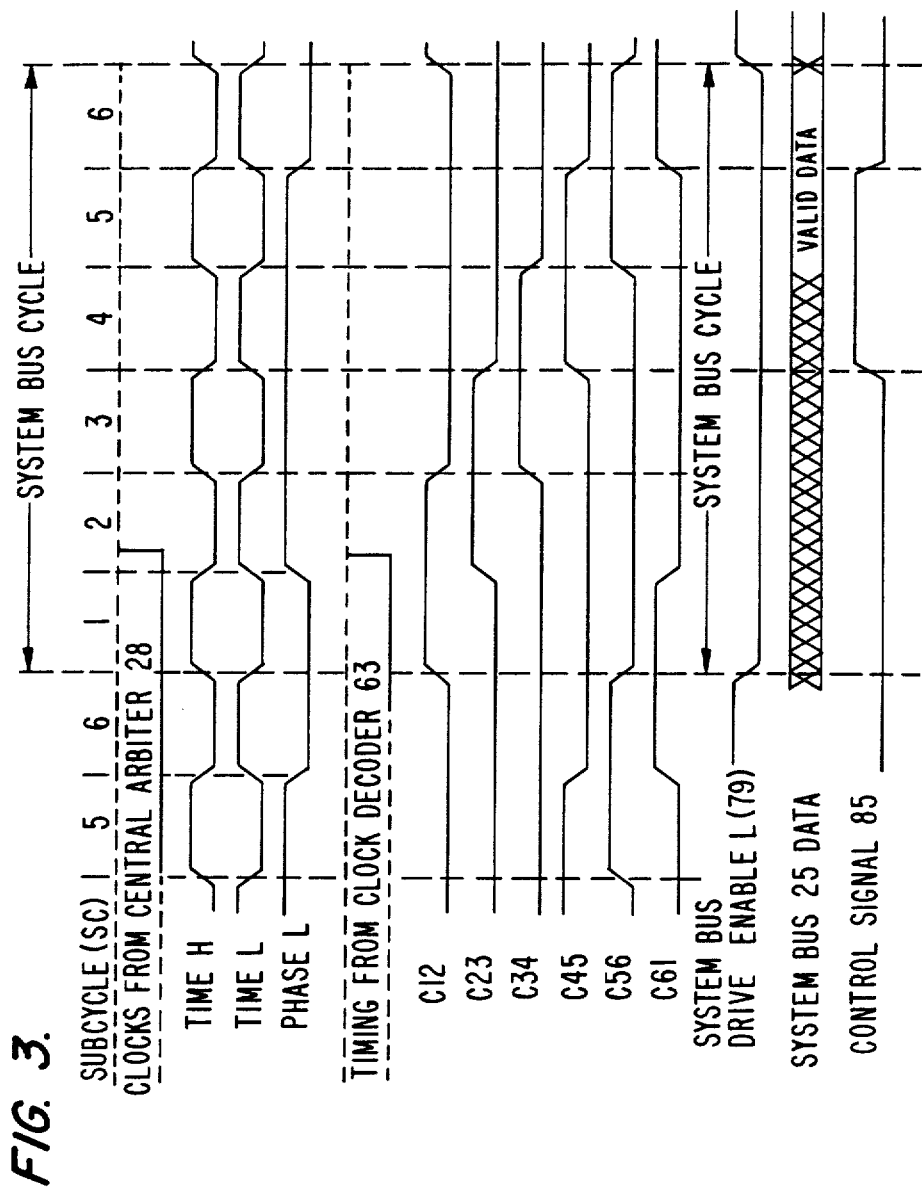
FIG. 3 is a representative timing diagram showing one bus cycle of the data processing system of FIG. 1.

FIG. 3 is a timing diagram showing one bus cycle, the clock signals received by clock decoder 63 from central arbiter 28 (FIG. 1), and curtain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in FIG. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus has its own corresponding set of timing signals generated by its clock decoder 63. While nominally the corresponding signals occur at exactly the same time in every node throughout the system 20, variation between clock decoder 63 and other circuitry in multiple nodes introduce timing variations between corresponding signals. These timing variations are commonly known as "clock skew."

Figure 4:
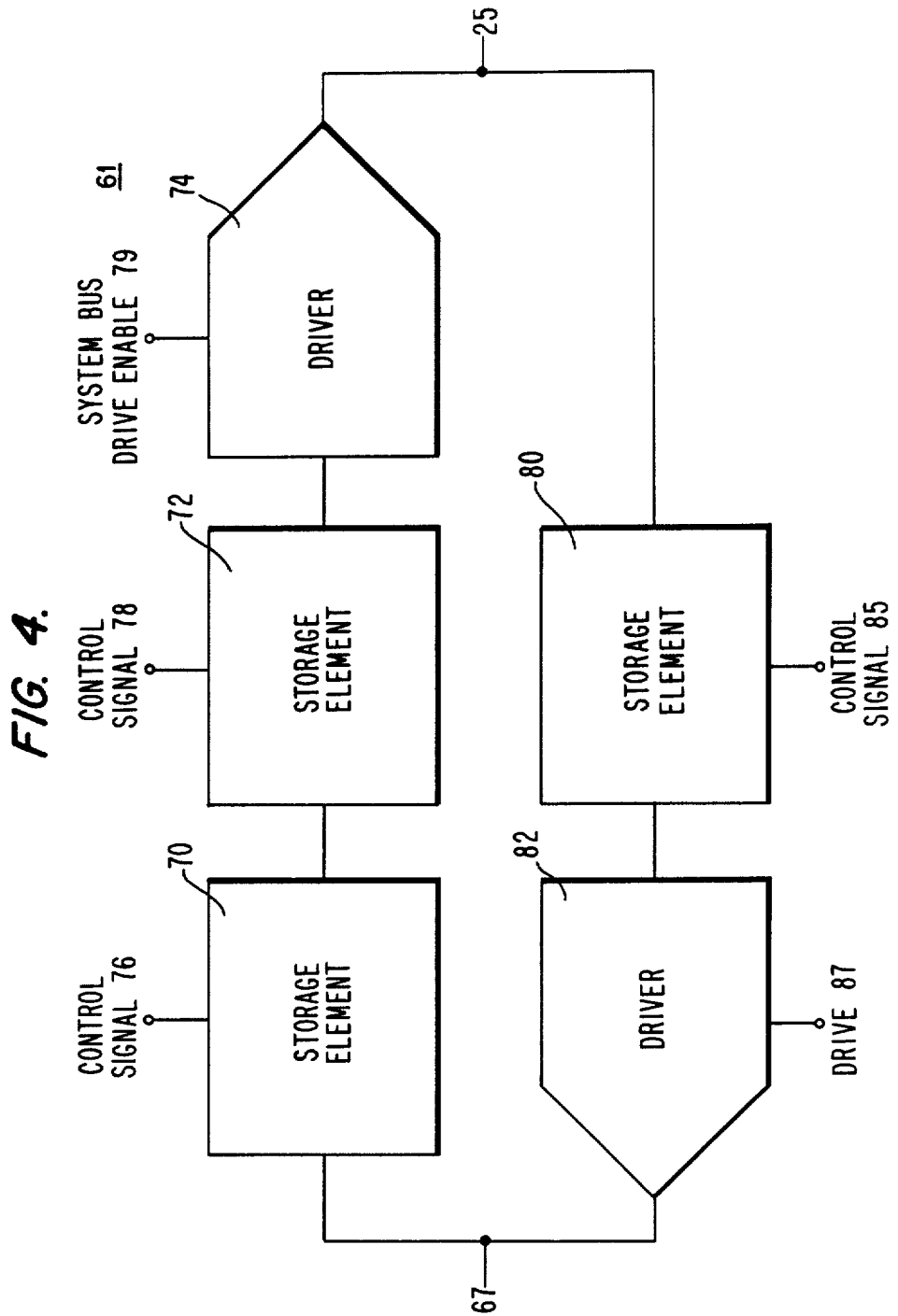
FIG. 4 is a block diagram of a data interface used in the nodes of FIGS. 1 and 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as a transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Storage elements 70 and 72 controlled by node bus control signals 76 and 78, respectively, which are derived from the timing signals generated by clock decoder 63. Storage elements 70 and 72 provide a two-stage temporary storage for pipelining data from node bus 67 to system bus 25. Different numbers of storage stages can also be used.

System bus driver 74 is controlled by system bus drive enable 79. According to the state of the system bus drive enable 79, the input of system bus driver 4 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80 is controlled by a system bus control signal 85 which is derived from the timing signals generated by clock decoder 63. A node bus drive signal 87 controls node bus driver 82 similar to the manner in which system bus drive signal 79 controls system bus driver 74. Thus, in response to node bus driver signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the beginning to t e end of a bus cycle. The new data become available for receipt from system bus 25 sometime later in the bus cycle after driver propagation and bus settling time has occurred. In the present embodiment, storage element 80 is a transparent latch. Control signal 85 is logically equivalent to clock C45. The bus timimg assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment node 60 shown in FIG. 2, node bus 67 is an interconnect system consisting of point-to-point connections between the system bus interface 64 and the node specific logic 65. In accordance with the present invention, however, there is no requirement for such a connection and node bus 67 could support more than two cycles.

Figure 5:
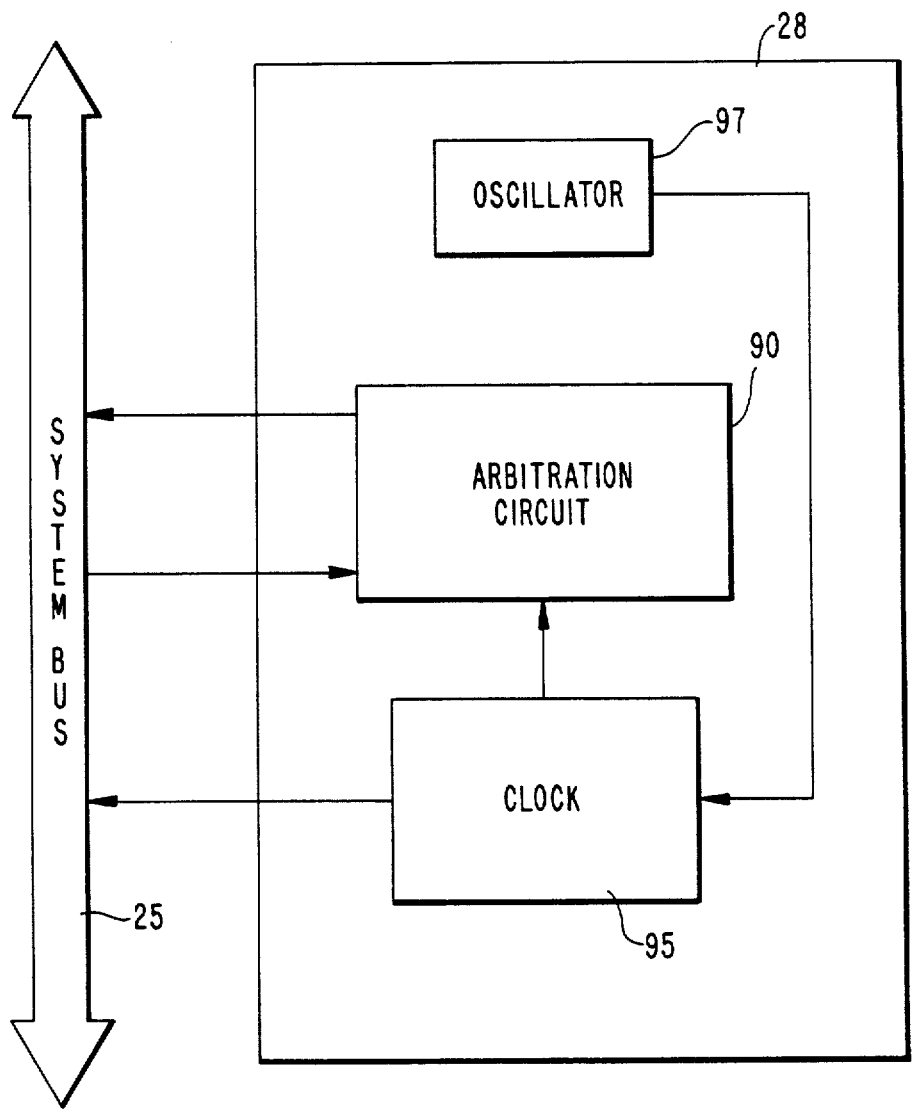
FIG. 5 is a block diagram of a central arbiter of the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25 which request ownership of that bus. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 90 receives the commander and responder request signals, arbitrates conflicts between nodes desiring access to system bus 25, and maintains the queues referred to above for the commander and responder requests. Arbitration circuit 90 also provides certain control signals to clock 95.

B. The Subject Invention

Figure 6:
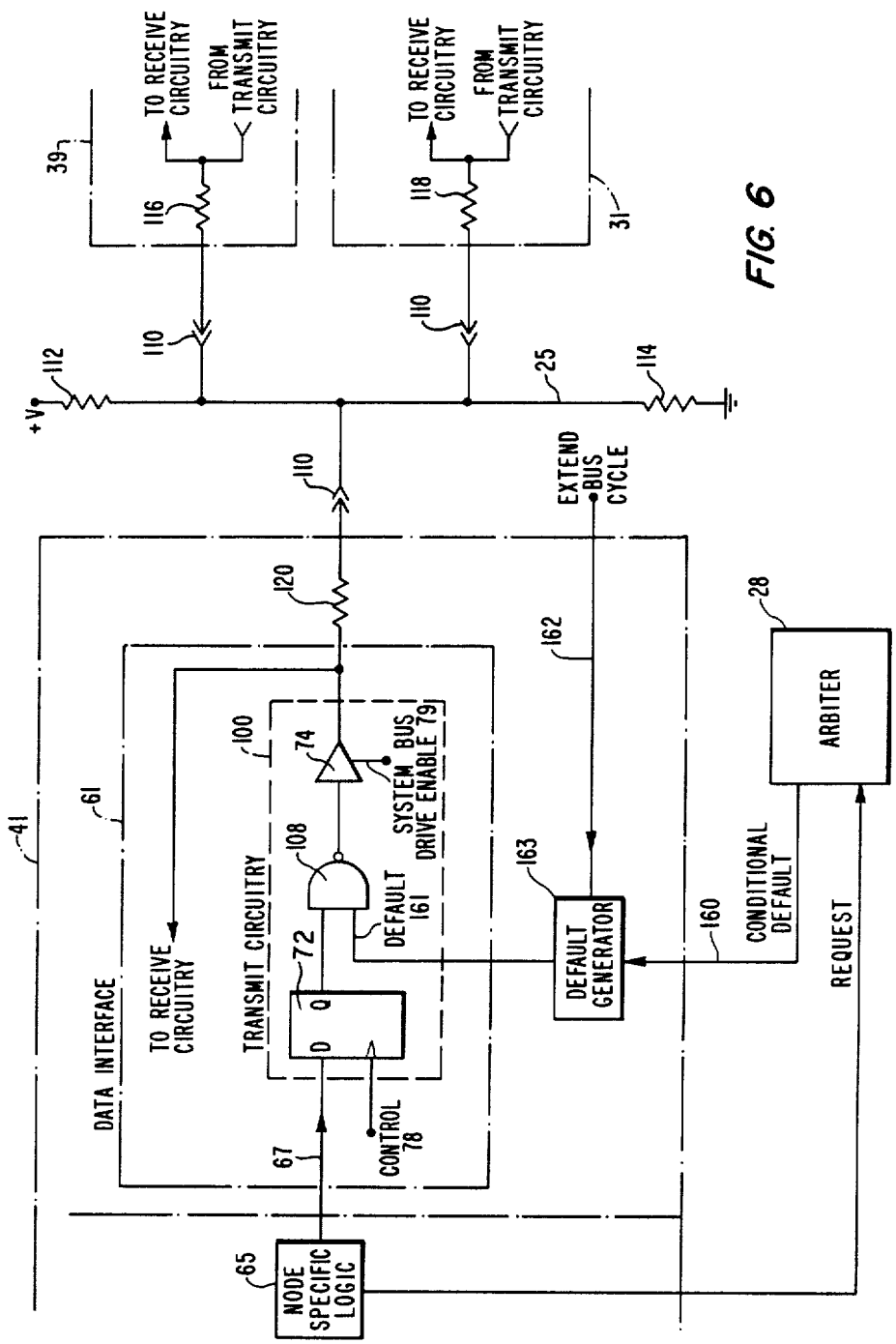
FIG. 6 is a block diagram of a backplane system bus and including the arbiter and exemplary nodes of the data processing system of FIG. 1.

The present invention will now be explained in detail with particular reference to the preferred embodiment which is illustrated in FIG. 6. As stated previously, like reference characters are used throughout the drawings to indicate like elements. Thus, where an element has been previously identified and discussed, such details will not be repeated in this section. Instead, reference should be had to the previous discussion of that element and/or to the co-pending application which is identified above.

In accordance with the present invention, a system is provided for transmitting and receiving data between a plurality of nodes, each node including logic circuitry for transmitting and receiving the data, the logic circuitry being operable from first and second logic levels. According to a preferred embodiment as illustrated in FIG. 6, the nodes are identified by reference characters 31, 39 and 41 which are examples of the various nodes depicted in FIG. 1 and discussed above. It should be appreciated, however, that these nodes are merely exemplary of various nodes which can be coupled to the bus 25; thus, no limitation regarding the type of node is intended by the ones illustrated in FIG. 6. As shown, each node has the capability of both transmitting and receiving data.

The nodes 39, 31 and 41 include logic circuitry which is adapted to operate from first and second supply voltages. Since CMOS technology is employed in the preference node circuitry for transmitting and receiving data via the bus 25, these supply voltages may correspond to 0 and +5 volts, respectively.

The receive logic circuitry in each node comprises, according to the presently preferred embodiment, a CMOS storage element or latch and a CMOS driver (neither shown). These logic circuits are arranged so as to receive data from the bus for further processing, as described previously.

Transmit logic circuitry 100 of node 41 is adapted, in the illustrated exemplary embodiment, to transmit data to other devices, e.g., the receive circuitry of nodes 39, 31. The transmit logic circuitry in the other nodes is similarly adapted to transmit data to other nodes. This logic circuitry includes, in accordance with the present invention, a driver for transmitting data onto the bus. As embodied herein, transmit logic circuitry 100 includes driver 74 at its output. A driver is included in each transmitting logic circuitry. These drivers are preferably CMOS tri-state drivers.

Transmit logic circuitry 100 preferably comprises a CMOS storage element, such as storage element 72. and control circuitry, such as node specific logic 65 connected by node bus 67. For ease of description, storage element 70 (FIG. 4) has been omitted from FIG. 6. The input of storage element 72 is connected to logic 65 so as to receive data to be transmitted to other devices within the computer system, while the clock of storage element 72 is coupled to control 78 as described previously. The output of storage element 72 is respectively coupled to one input of NAND gate 108 while the other input of gate 108 is coupled to default generator 163 via a line label "Default." The output of gate 108 is coupled to the input of driver 74 which has a tri-state control connected to System Bus Drive Enable 79 in the manner described above. I node 41 is a node used to default the bus as shown here then one input to default generator 163 is coupled to an arbiter 28 by the line labeled conditional default 160, otherwise that input is connected in such a manner so as to prevent the node front defaulting the bus during periods of inactivity. A second input to default circuitry 163 is connected to Extend Bus Cycle line 162. Further information concerning NAND gate 108 and default generator 163 and their "default" operation is provided below. Driver 74 provides a high impedance to the bus 25 when Enable signal 79 is inactive.

Although not shown in FIG. 6, the devices contained within each of the transmit and receive logic circuitry are preferably CMOS logic, for example, such supply voltages may correspond to +5 and 0 volts, respectively. These arrangements are well known in the art and need not be described further for purposes of understanding the present invention. Additionally, it should be appreciated that supply levels other than 0 and +5 volts may be utilized without departing from the spirit or scope of the invention.

A bus is provided for carrying data between the nodes. As embodied herein, such a bus can be system bus 25 as shown in FIG. 6, and may comprise wire, etch or some other conductor suitable for carrying data present in computer systems. A connector 110 is connected between each node and the bus 25. In this manner, the bus may be disposed in a fixed position in the computer system while the nodes are selectively coupled thereto by appropriately plugging each node into a corresponding one of connectors 110. Such an arrangement is commonly referred to as a "backplane system," with system bus 25 being known as a "backplane system bus."

According to the invention, means are provided for biasing the bus to place the bus at a voltage level intermediate the first and second logic levels if none of the nodes is transmitting data on the bus. As embodied in FIG. 6, such means includes a first resistor 112 and a second resistor 114. Resistor 112 is preferably connected between a first end of bus 25 and the first supply voltage, +V, which may be +5 volts in the case of CMOS devices. Resistor 114 is preferably connected between a second end of bus 25 and the second supply voltage, which may be ground as depicted in FIG. 6. In the embodiment of the invention shown in FIG. 6, resistors 112 and 114 are of approximately the same value therefore the intermediate level would be approximately 2.5 volts.

In the presently preferred embodiment, resistors 112 and 114 are also used to terminate the ends of bus 25 to accelerate the transition between data levels on the bus to decrease transition times, as later explained. Thus, other arrangements and equivalent circuits may be employed in lieu of the illustrated resistors so as to achieve these functions.

The driver 74 in each node is individually coupled to the connector for that node. This coupling provides impedance matching between the bus and the nodes, reduces the driver switching noise, lowers the power dissipation in the drivers, and permits driver overlap to occur on bus 25. As illustrated in FIG. 6, this coupling is identified by reference characters 116, 118 and 120. In the preferred embodiment, each comprises a coupling resistor for coupling nodes 39, 31 and 41, respectively, to bus 25.

With respect to the receive circuitry of the nodes 31, 39, 41, coupling resistors 116, 118 and 120 are individually coupled between bus 25 and the input of their respective drivers (not shown). With respect to the transmit logic circuitry 100, these coupling resistors are respectively coupled between bus 25 and the output of their respective tri-state drivers, e.g., driver 74. According to the presently preferred embodiment, coupling resistors 116, 118, and 120 are each disposed separately, i.e., externally, to their respective drivers. Further, each of coupling resistors 116, 118, and 120 preferably has a resistance that is several times, e.g., two to twenty times, the impedance of its corresponding CMOS driver. Additionally, the value of resistors 112 and 114 is selected to be several times, e.g. approximately five times, the value of coupling resistors 116, 118, and 120.

In accordance with the present invention, arbiter means are coupled to the nodes for detecting a lack of request activity among all of the logic circuit means coupled to the bus. As embodied herein and shown in FIG. 6, the arbiter means is indicated by reference character 28 and has been described previously. In particular, arbiter 28 receives a line label "Request" from each of the nodes in the system requiring access to the bus 25. The Request line is activated by the corresponding node when that node requests control of the system bus 25, i.e., a commander or responder request. Upon activation of the Request line, arbiter 28 recognizes that bus 25 coupled to the requesting node will be used in the following bus cycle. Conversely, should no requests be made by any of the nodes coupled to the particular bus, arbiter 28 recognizes that the bus may be unused in the following cycle. If in the case of an unused cycle no node drives the bus then resistors 112 and 114 will drive bus 25 to a voltage level intermediate the digital logic levels prevent during utilized bus cycles.

In accordance with the present invention, default generator means are designed to be connected to the arbiter means and to an extend bus cycle line to generate a default bus signal during a cycle when there is no activity on the bus. The default generator means is responsive to a conditional default signal from the arbiter and to activity on the extend bus cycle line so as not to default the bus 25 when a node is transferring data on the bus. As embodied herein, an extend bus cycle line 162 connected to default generator 163 is activated by a transmitter when that transmitter requires continued access to the bus during the next bus cycle. Thus the extend bus cycle line 62 provides a means for a transmitter to notify the rest of the system that it is performing a multi-cycle transfer, such as a write transfer which requires at least two bus cycles. The conditional default 160 is activated by the arbiter means 28 upon detection by the arbiter means 28 of the lack of request activity on the Request lines from the nodes. If the default generator 163 receives an activated conditional default 160 and the extend bus cycle line 162 is not activated, the default generator 163 will activate its default bus output signal 161. Conversely, if the extend bus cycle line 162 is activated when the conditional default 160 is received at default generator 163, then the default bus output 161 remains inactive even though the arbiter 28 has detected no activity on the Request lines. This latter condition indicates that although none of the nodes has requested to start a new transfer during the next bus cycle there is a transmitter which wishes to continue a previously started transfer, so the bus will not be inactive during the next bus cycle. Therefore there will be no need to default the bus.

The present invention further include means coupled to the default generator means for driving the bus to one of the first and second logic levels, instead of allowing the bus to assume the intermediate voltage level provided by the biasing means, upon detection by the default generator means of the lack of activity on the bus. As embodied herein, the driving means include NAND gate 108 with of its inputs coupled to the default bus output signal 161 label from default generator 163. In normal operation of node 41, for example, when data are being transmitted onto bus 25, default generator 163 recognizes that the bus is therefore being used and the default line is inactive. Data generated at node specific logic 65 can thus be passed through transmit circuitry 100 and into bus 25 in a normal fashion.

When default generator 163 determines, by an active conditional default 160 and an inactive Extend Bus Cycle 162, that bus 25 is not going to be used, default generater 163 causes the default line to be activated and Enable signal 79 is further activated in the manner described above, so that a high level is placed on bus 25 through this default action. Thus, the bus is driven to a defined logic level rather than being left at the intermediate level that would otherwise be provided by the action of resistors 112, 114. In the preferred system, nodes interpret a cycle during which all bus signals are high as a default cycle.

To fully appreciate the operation and concomitant advantages of a backplane bus according to the present invention, reference is made to a bus in which the following components are utilized: logic circuitry in nodes 31, 39, 41 include CMOS drivers, such as driver 74 in transmit logic circuitry 100, having a characteristic impedance in the range of 2 to 10 ohms; resistors 112 and 114 are each 150 ohm, 1% tolerance resistors; and coupling resistors 116, 118 and 120 are each within the range of 20 ohms to 40 ohms, preferably 30 ohm, 1% tolerance resistors. The supply voltage used is +5 volts, referenced to ground.

In operation, data generated, such as by node specific logic 65 described previously, are transmitted to bus 25 by transmit circuitry, such as logic circuitry 100 of node 41. These data, in the case of CMOS logic using 0 and +5 volts, are of a digital nature having recognizable low and high threshhold levels occurring at 2.0 volts and 3.0 volts, respectively. Such data are carried on bus 25 and are received by receive circuitry in nodes 31 and 39, for example, which undertake further processing on or as a result of the received data. There is a matching in the technology used in that the need for convering from CMOS logic to other logic (such as TTL) to achieve satisfactory data transmission is eliminated. This achieves a reduction in circuitry required and in various associated costs. Secondly, there is substantial matching of the impedance of the nodes with that of the bus. In the aforedescribed embodiment, the impedance of each node is approximately 30 ohms while the impedance of the bus is in the vicinity of 30 to 60 ohms, i.e., only one to two times greater. This impedance matching allows for better communication of data between the bus and the nodes with minimal reflection and waste of the energy in the signals.

Use of coupling resistors 116, 118 and 120 which are external to the logic circuitry drivers also provides several advantages. The CMOS manufacturing process can alter the impedance of CMOS drivers virtually anywhere within the range of 2 to 10 ohms. When this impedance is summed with the higher resistance (30 ohms) of the respective coupling resistor, any variation due to the CMOS manufacturing process is essentially eliminated. This results in a much more consistent driver output impedence.

Because of the greater resistance of coupling resistors 116,118, and 120 relative to their respective CMOS drivers, power dissipated within a node connected to bus 2 will chiefly be dissipated via coupling resistors 116, 118, and 120 rather than through drivers such as driver 74. The shifting of the power dissipation burden from the drivers to the coupling resistors permits more drivers to be implemented in a single integrated circuit package, thus reducing the board area required for the bus interface logic. Placing more drivers in the same package however results in increased noise on the clip power and ground references due to the higher di/dt of the current through the inductances in the power and ground circuits of the package. Traditionally this problem has been solved by using more pins on the package for power and ground. These additional power and ground pins necessitate the use of higher pin count packages which in turn require more space on the printed circuit board for the bus interface logic. The use of coupling resistors 116, 118, and 120 reduce by a factor of 5 to 10 this di/dt and therefore the noise induced on the power and ground references, circumventing the need for additional power and ground pins.

In prior art designs, the timing of the control signals on the bus assured that there was never a situation when more than one driver was driving the bus at the same time. Otherwise, it was possible that driver damage would result due to excessive output currents. At a minimum, high levels of di/dt noise would be generated. In the past, the multiple-driver condition has been avoided by providing a non-overlap time between the end of the drive time for the previous bus driver and the beginning of the drive time for the next driver. This end for non-overlap time increases bus cycle time. The current embodiment provides a novel solution for reducing bus cycle time allowing the drive times of the drivers to overlap, yet at the same time avoids the problems which the prior art devices would suffer due to such overlap, such as the risk of driver damage or the generation of excessive noise levels. These benefits are the result of the coupling resistors which limit the overlap current between any two overlapping drivers to an acceptable level. Thus, by permitting driver overlap, the portion of the bus cycle time that traditionally was allotted for non-overlap time can be removed, thereby reducing the bus cycle time and increasing performance of the system.

As mentioned previously, CMOS logic typically interprets 2.0 volts and lower as a low level and 3.0 volts and higher as a high level. In most prior art devices, buses are employed which swing data levels from one power supply level to the other, i.e., from 0 volts to +5 volts for a total swing of 5 volts. In a bus according to the present invention, the combined voltage divider effect of resistors 112 and 114 with coupling resistors 116, 118, and 120 causes a reduction in this swing, i.e., from about 0.8 volt to about 4.2 volts for a total swing of about 3.4 volts. Since dynamic power dissipation is proportional to voltage squared, this improvement in swing correlates to a relative reduction from 25 (5 squared) to 12 (3.4 squared), or about a 2:1 savings. rent source for decreasing the overall transition time of the bus data from one state to another. To achieve this reduction in transition time, this current source acts is parallel with the driver in the transmitter which is providing data on the bus. The provision of this current source thus substantially increases the speed at which the bus can be cycled and thereby increases system performance. Specifically, in this embodiment, resistors 112 and 114 create a Thevenin equivalent circuit of 75 ohms connecting the system bus to a nominal 2.5 volts. To illustrate the effect of this equivalent circuit on bus speed, the equivalent circuit should be considered in conjunction with the coupling resistors 116, 118, and 120. Combined, the equivalent circuit and coupling resistors serve to establish nominal high voltage, voh, and nominal low voltage, vol, levels on the system bus 25 of about 4.2 volts and 0.8 volt, respectively. Since any transition from vol to the high threshold (here nominally 3.0 volts) or from voh to low threshold (here nominally 2.0 volts) passes through the 2.5 volt level, the equivalent circuit bids the transition by sourcing current for approximately 75% of the transition time, thus decreasing the time required to make the transition.

A current source, as described above, has the side effect of driving the bus 25 to the Thevenin voltage of 2.5 volts whenever there is a cycle when no node is a transmitter. Allowing the bus 25 to remain at such an intermediate voltage when it has been determined that the bus is not going to be used introduces the possibility of damage to the receive circuitry or may result in erroneous operations being introduced into the computer system. Such erroneous operations are a consequence of the intermediate voltage being interpreted as either a low level or a high level by nodes coupled to the bus. Although partly or other error-detecting operations are typically carried out in such systems, the possibility that a node could interpret the intermediate level on the bus as a logic level makes it likely that parity checks cannot be consistently carried out since it would be difficult to take into consideration the alternative decisions made by the nodes. The present invention avoids this dilemma by driving the bus 25 to either one of the known logic levels whenever the bus is not going to be used.

A further advantage of the present invention involves detection by default generator of operations which may require multiple cycles of the bus. For example, read operations involve only a single bus cycle whereas write operations involve at least two bus cycles even though a particular bus may not be utilized for the first of the two cycles. In such instances, suitable data communicated to default generator 163 via the Extend Bus Cycle line is recognized as calling for more than one bus cycle, and so the default generator does not activate the default line until after the required cycles have elapsed. In the case of a write operation, for example, default generator 163 thus does not cause defaulting of bus 25 even though the arbited 28 does not detect activity on the Request lines during the first of the two bus cycles. Other arrangements involving multiple cycles are considered to be within the spirit and scope of the present invention as well.

While FIG. 6 illustrates bus 25 as being a single conductor, it should be appreciated from the foregoing description that multiple or parallel buses can be utilized so is to accomodate data having multiple bits. For example, computed systems having up to 77 parallel bits of data have been constructed using backplane bus arrangements according to the present invention. Additional buses can also be provided to accomodate other data, such as common clocks and control data which are needed by the system.

Also as discussed previously, the bus is preferably constructed so as to have connectors 110 which permit nodes 31, 39 and 41 to be selectively plugged therein. In this manner, various nodes can be connected to bus 25 in order to provide the particular computer system desired by the user Conversely stated, the nodes can be provided on "boards" such is printed circuit cards suitable for plugging into connectors 110. This arrangement is shown diagrammatically in FIG. 6 by the dot-dash lines individually surrounding each of nodes 31, 39 and 41. Such arrangements are well known in the art and need not be further explained here for purposes of understanding the present invention.

It will therefore be apparent to those skilled in the art that various modifications and variations can be made in the apparatus of the present invention. Thus, it is intended that the specification and drawings be considered as exemplary only, with the true scope and spirit of the invention being indicated by the following claims.

What is claimed is:

1. A system for transmitting and receiving data between a plurality of nodes containing logic circuit means for selectively transmitting data at first and second logic levels, comprising:
   a bus coupled to the nodes for carrying the data between the nodes;
   means for biasing the bus to place the bus at a voltage level intermediate said first and second logic levels if none of said nodes is driving the bus;
   arbiter means coupled to said nodes for detecting a lack of request activity from the logic circuit means coupled to the bus and activating a conditional default line when no request activity is detected;
   an extend bus cycle line coupled to said nodes for notifying said nodes that a multi-cycle transfer is being performed by one of the nodes;
   default generator means, within at least one of said nodes coupled to said extend bus cycle line and connected to said conditional default line from said arbiter means, for activating a default bus signal during cycles when there is no activity on the bus, as determined by said conditional default line being activated and said extend bus cycle line being deactivated in a previous cycle; and
   means, within each node containing said default generator means and responsive to said default bus signal, for driving the bus to one of said first and second logic levels, instead of allowing the bus to assume the intermediate voltage level, upon detection by said default generator means of said lack of activity on the bus.

2. A system as recited in claim 1, wherein said nodes are connected to the extend bus cycle line in a wired OR configuration.

3. A system as recited in claim 1 wherein said driving means includes a logic gate connected to receive said default bus signal.

4. A system as recited in claim 1, wherein said nodes further include receive logic circuit means for receiving the data carried on the bus.

5. A system as recited in claim 1, wherein said biasing means comprises first and second resistors and first and second supply voltages, said first resistor connecting one end of said bus to said first supply voltage and said second resistor connecting an other end of said bus to said second supply voltage.

6. A system as recited in claim 5 wherein said logic circuit means is CMOS.

7. A system for transmitting and receiving data between a plurality of nodes, comprising:
- a plurality of nodes, each of which includes logic circuitry for transmitting and receiving data at first and second logic levels;
- a bus carrying the data between the nodes;
- a connector for individually connecting each of said nodes to said bus;
- first and second resistors;
- first and second supply voltages, said first resistor connecting one end of said bus to said first supply voltage and said second resistor connecting the other end of said bus to said second supply voltage, said supply voltages and said resistors placing said bus at a voltage level intermediate said first and second logic levels if none of said nodes is transmitting data;
- arbiter means coupled to said nodes for detecting a lack of request activity from the logic circuit means coupled to the bus and providing a conditional default when no request activity is detected;
- an extend bus cycle line coupled to said nodes for notifying said nodes that a multi-cycle transfer is being performed;
- default generator means within at least one of said nodes coupled to said extend bus cycle line and connected to said conditional default line from said arbiter means for generating a default bus signal during cycles when there is no activity on the bus, as determined by said conditional default signal being activated and said extend bus cycle line being deactivated in a previous cycle;
- means within each node coupled to said default generator means of that node and responsive to said default bus signal for driving the bus to one of said first and second logic levels, instead of allowing the bus to assume the intermediate voltage level, upon detection by said default generator means of said lack of activity on the bus.

* * * * *